(12) United States Patent
Song et al.

(10) Patent No.: US 11,363,182 B2
(45) Date of Patent: Jun. 14, 2022

(54) CAMERA MODULE

(71) Applicant: LG INNOTEK CO., LTD., Seoul (KR)

(72) Inventors: Yun Sang Song, Seoul (KR); In Tae Kim, Seoul (KR); Jung Shik Baik, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 131 days.

(21) Appl. No.: 16/963,979

(22) PCT Filed: Jan. 21, 2019

(86) PCT No.: PCT/KR2019/000828
§ 371 (c)(1),
(2) Date: Jul. 22, 2020

(87) PCT Pub. No.: WO2019/146974
PCT Pub. Date: Aug. 1, 2019

(65) Prior Publication Data
US 2021/0044731 A1    Feb. 11, 2021

(30) Foreign Application Priority Data

Jan. 23, 2018 (KR) .................... 10-2018-0008346

(51) Int. Cl.
*H04N 5/225* (2006.01)
*G02B 7/02* (2021.01)
*G03B 17/12* (2021.01)
(52) U.S. Cl.
CPC ............. *H04N 5/2257* (2013.01); *G02B 7/02* (2013.01); *G03B 17/12* (2013.01)

(58) Field of Classification Search
CPC ...... G02B 13/001; G02B 27/646; G02B 3/14; G02B 7/02; G02B 7/08; G03B 17/12;
(Continued)

(56) References Cited

U.S. PATENT DOCUMENTS 10,097,742 B1* 10/2018 Moon ................... H04N 5/2254
2008/0013187 A1* 1/2008 Craen ....................... G02B 3/14
359/665
(Continued)

FOREIGN PATENT DOCUMENTS

CN          1669305 A     9/2006
EP        1 906 213 A1    4/2008
(Continued)

*Primary Examiner* — Amy R Hsu
(74) *Attorney, Agent, or Firm* — Birch, Stewart, Kolasch & Birch, LLP

(57) ABSTRACT

A camera module includes a liquid lens unit; a lens holder in which the liquid lens unit is disposed; a main board configured to supply a driving signal to drive the liquid lens unit; and a base disposed on the main board, the base having an inner space in which the liquid lens unit is disposed, wherein the liquid lens unit includes: a liquid lens including upper electrodes and a lower electrode; and a lower connection substrate connected to the lower electrode, and wherein the base includes: an upper connection part configured to electrically connect the upper electrodes to the main board, the upper connection part being disposed adjacent to the upper electrodes in a plan view; and a lower connection part configured to electrically connect the lower connection substrate to the main board.

20 Claims, 10 Drawing Sheets

(58) Field of Classification Search
CPC ...... G03B 2205/0084; G03B 2217/005; G03B 30/00; G03B 3/10; G03B 5/00; H04N 5/2254; H04N 5/2257
See application file for complete search history.

(56) References Cited

U.S. PATENT DOCUMENTS

| | | |
|---|---|---|
| 2008/0037973 A1 | 2/2008 | Jung |
| 2008/0267603 A1 | 10/2008 | Jung et al. |
| 2009/0190232 A1 | 7/2009 | Craen et al. |
| 2010/0202054 A1 | 8/2010 | Niederer |
| 2010/0247086 A1* | 9/2010 | Tallaron ............ G02B 3/14 359/666 |
| 2011/0134303 A1 | 6/2011 | Jung |
| 2012/0170923 A1 | 7/2012 | Seo |
| 2012/0320288 A1* | 12/2012 | Baek ............ G02B 30/27 349/200 |
| 2015/0331156 A1* | 11/2015 | Hirsa ............ G02B 3/14 359/666 |
| 2017/0315274 A1* | 11/2017 | Park ............ G02B 3/00 |
| 2019/0028624 A1 | 1/2019 | Choi |
| 2019/0250312 A1* | 8/2019 | Moon ............ G03B 37/04 |

FOREIGN PATENT DOCUMENTS

| | | |
|---|---|---|
| KR | 10-2009-0109272 A | 10/2009 |
| KR | 10-2011-0664156 A | 6/2011 |
| KR | 10-2011-0127921 A | 11/2011 |
| KR | 10-2012-0076285 A | 7/2012 |
| KR | 10-2017-0083254 A | 7/2017 |
| KR | 10-2017-0129532 A | 11/2017 |

* cited by examiner

[FIG. 1]
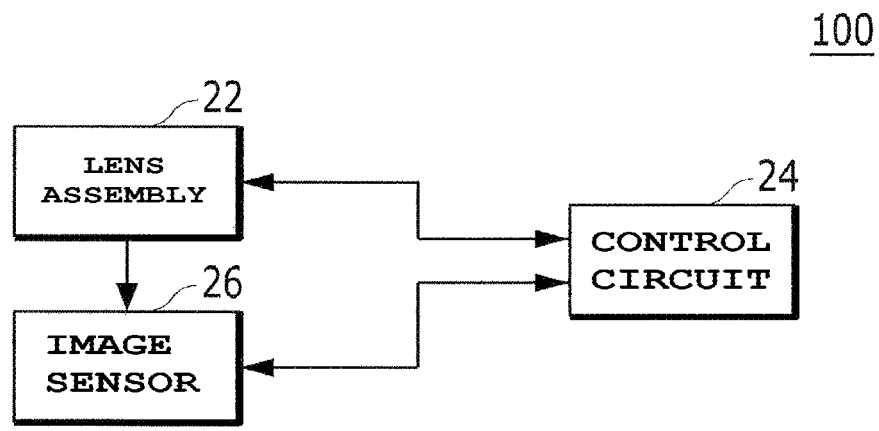
[FIG. 2]
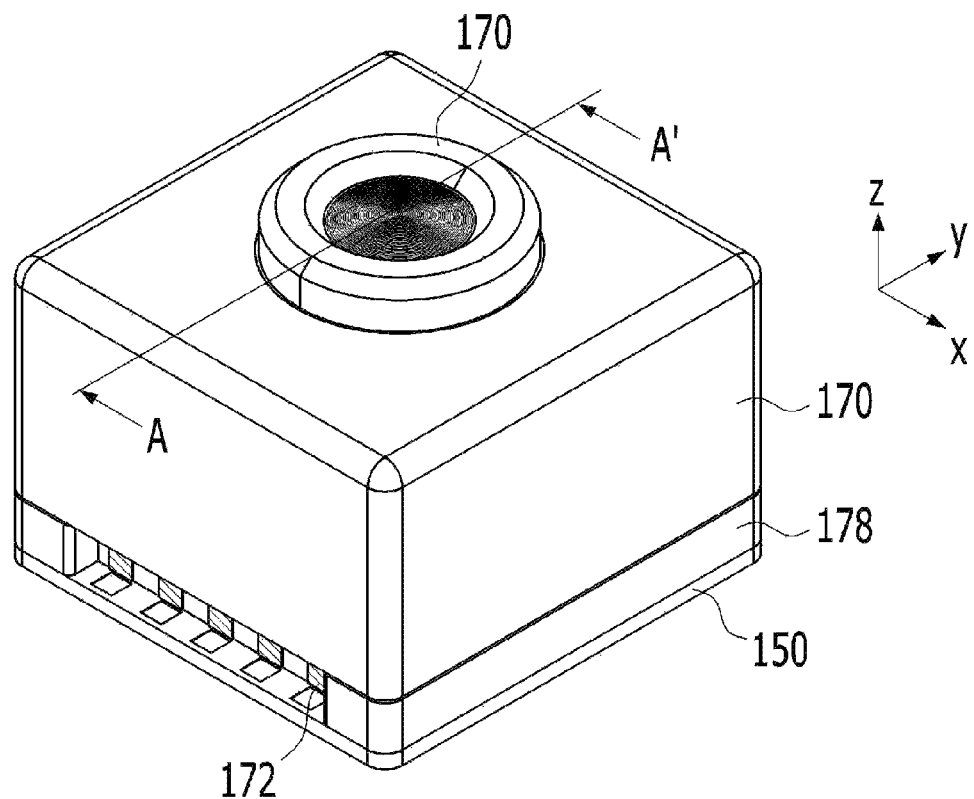

[FIG. 3]
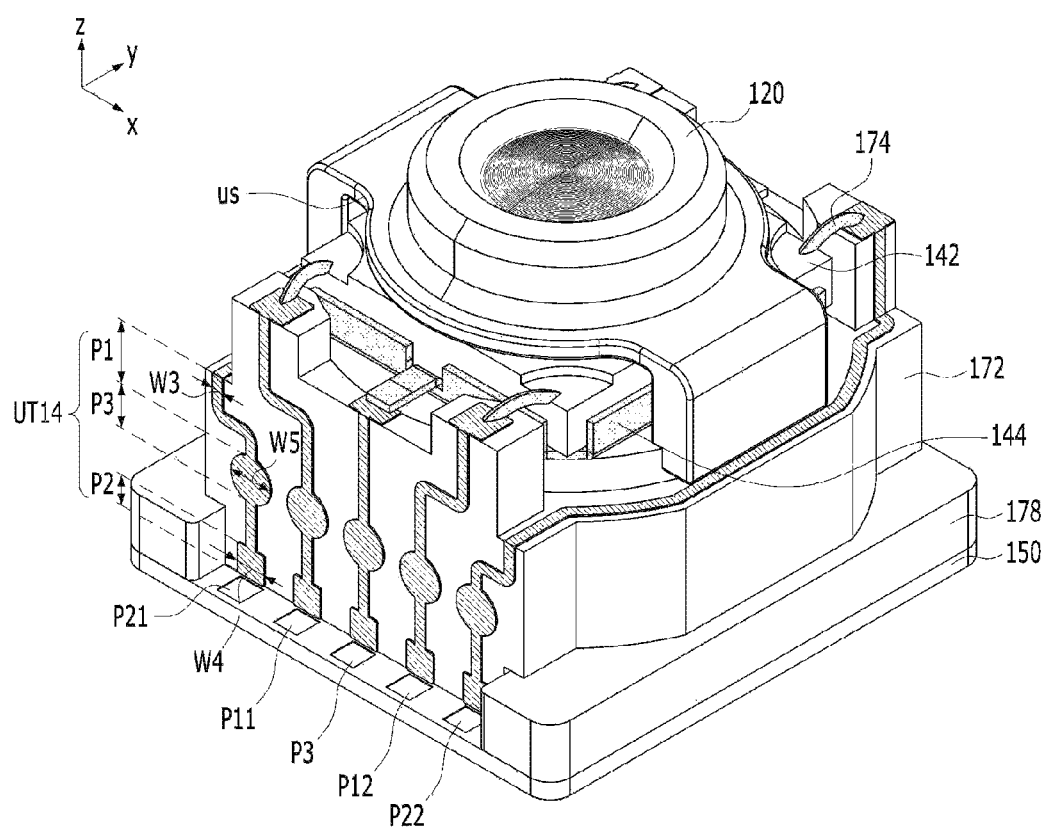

[FIG. 4]
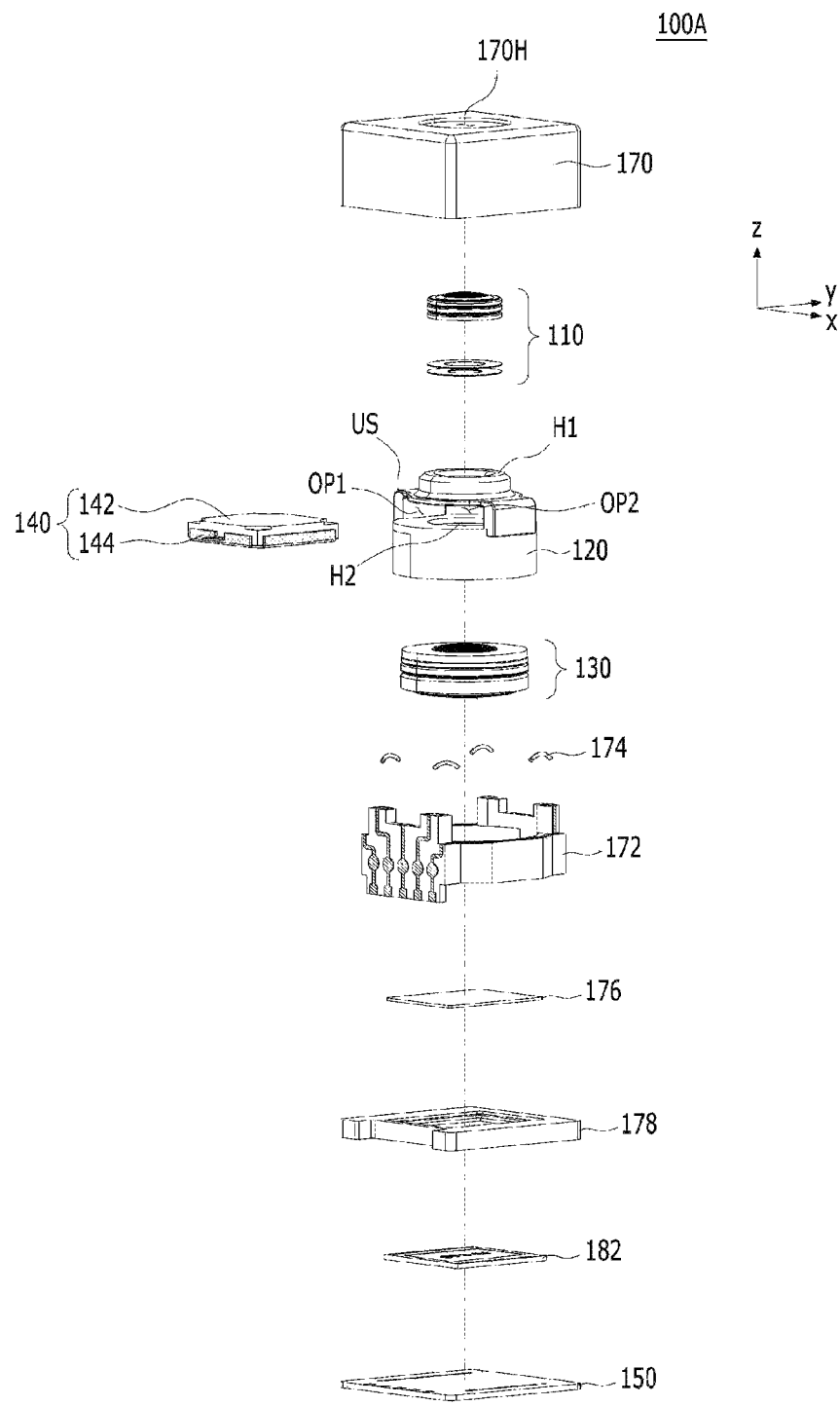

[FIG. 5]
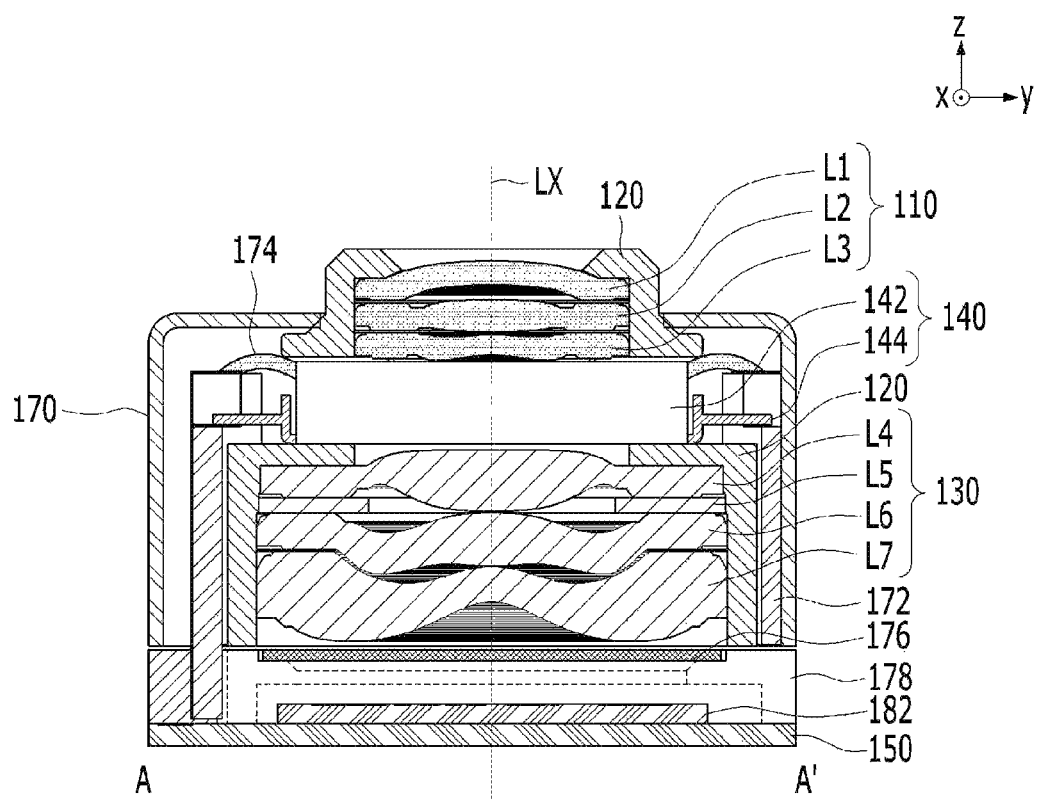

[FIG. 6]
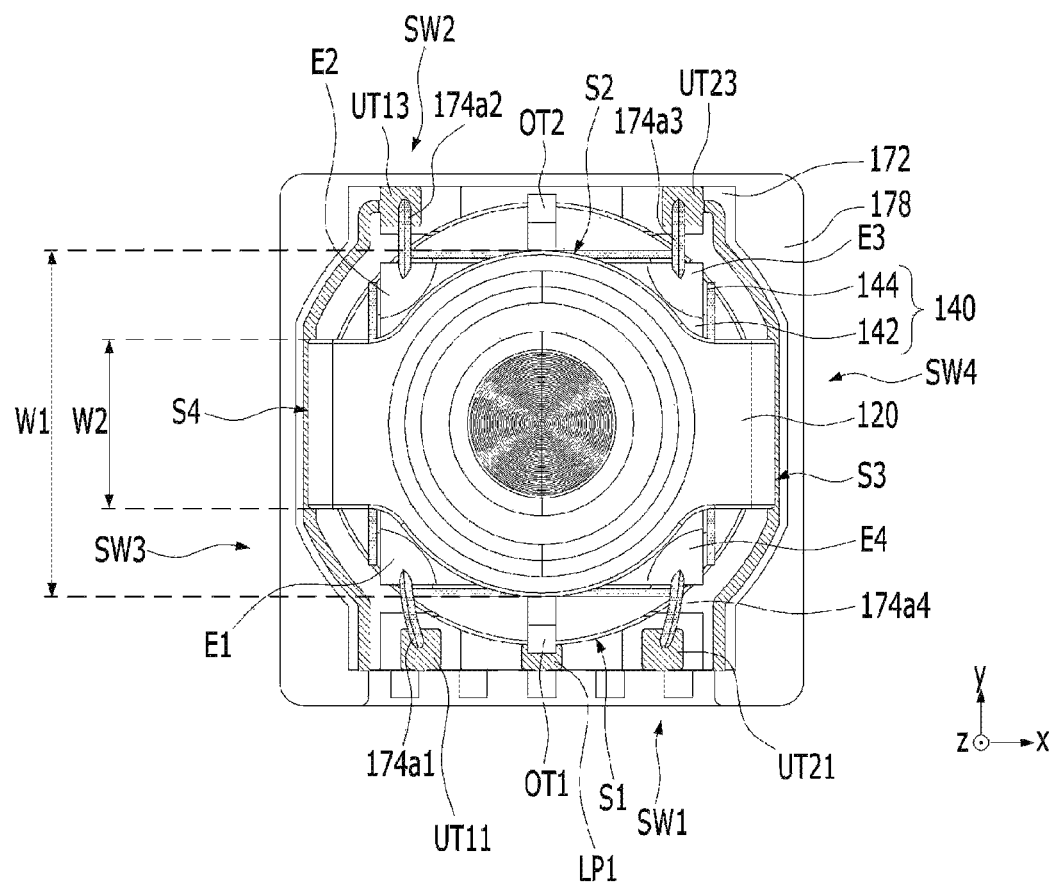

[FIG. 7]
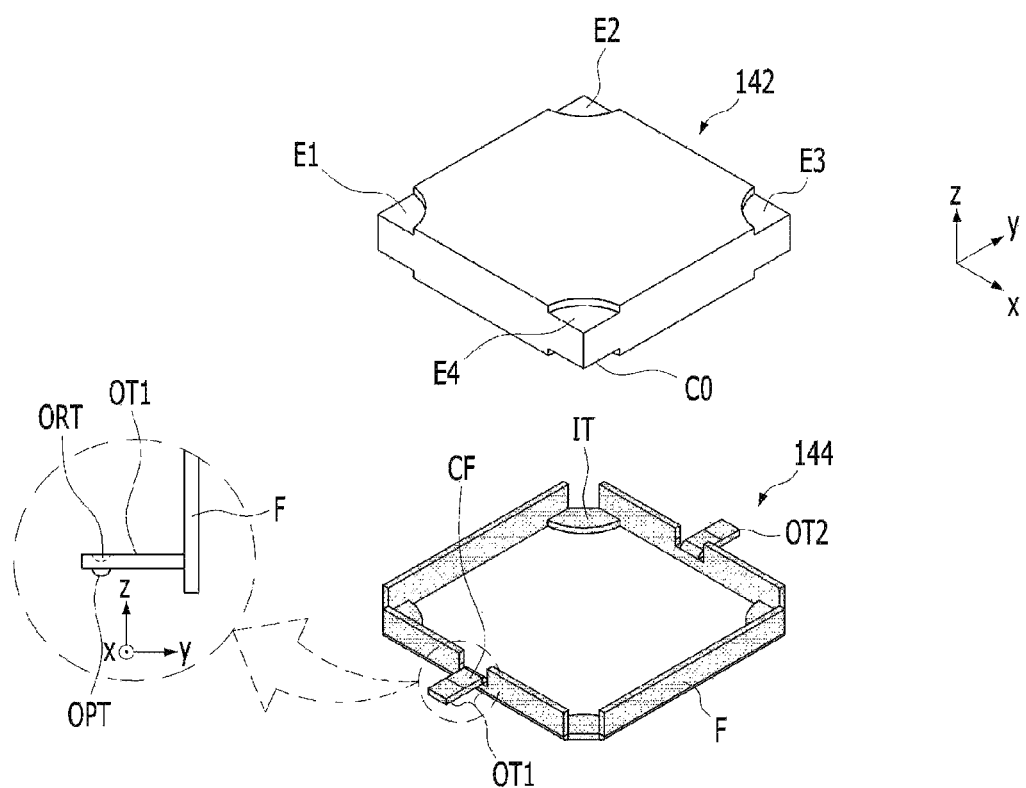

[FIG. 8]
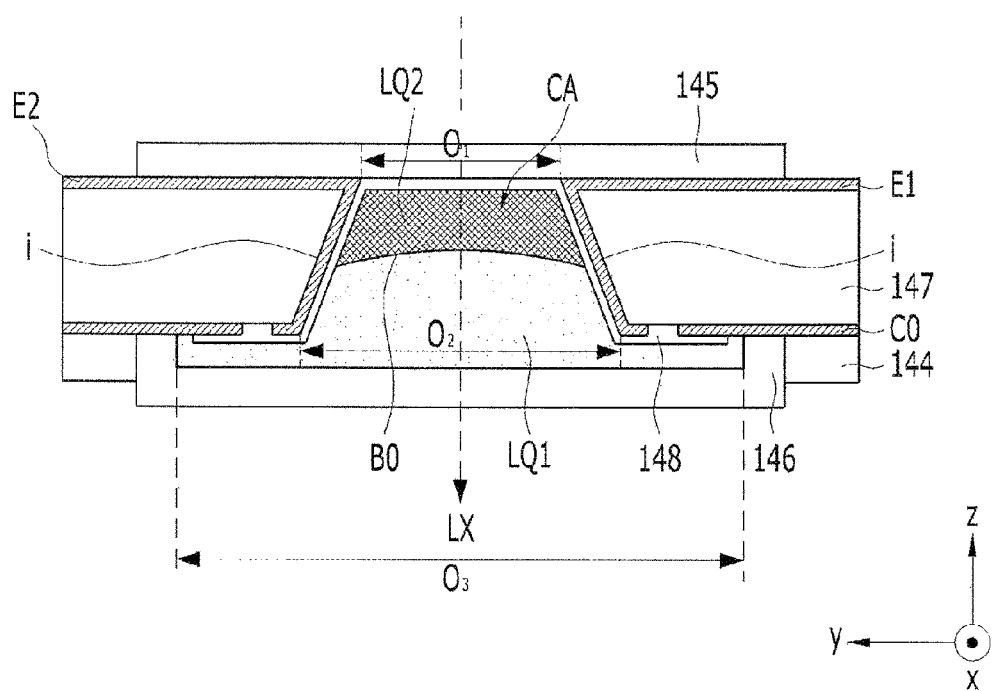

【FIG. 9】
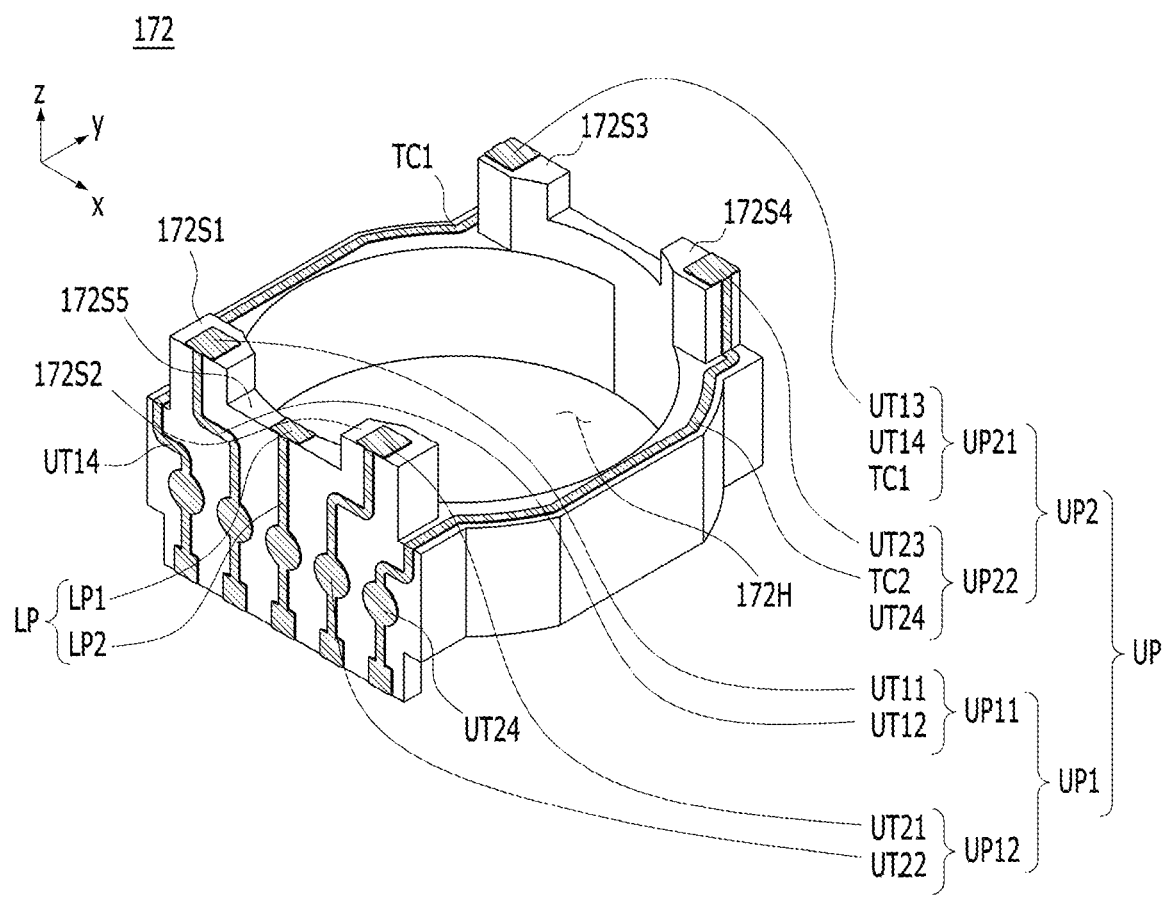

【FIG. 10】
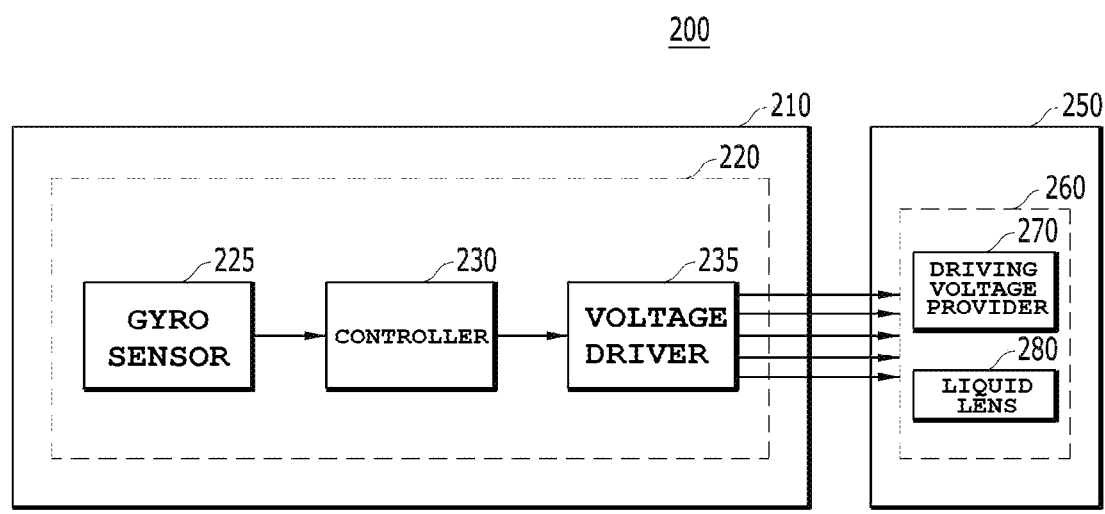

[FIG. 11]
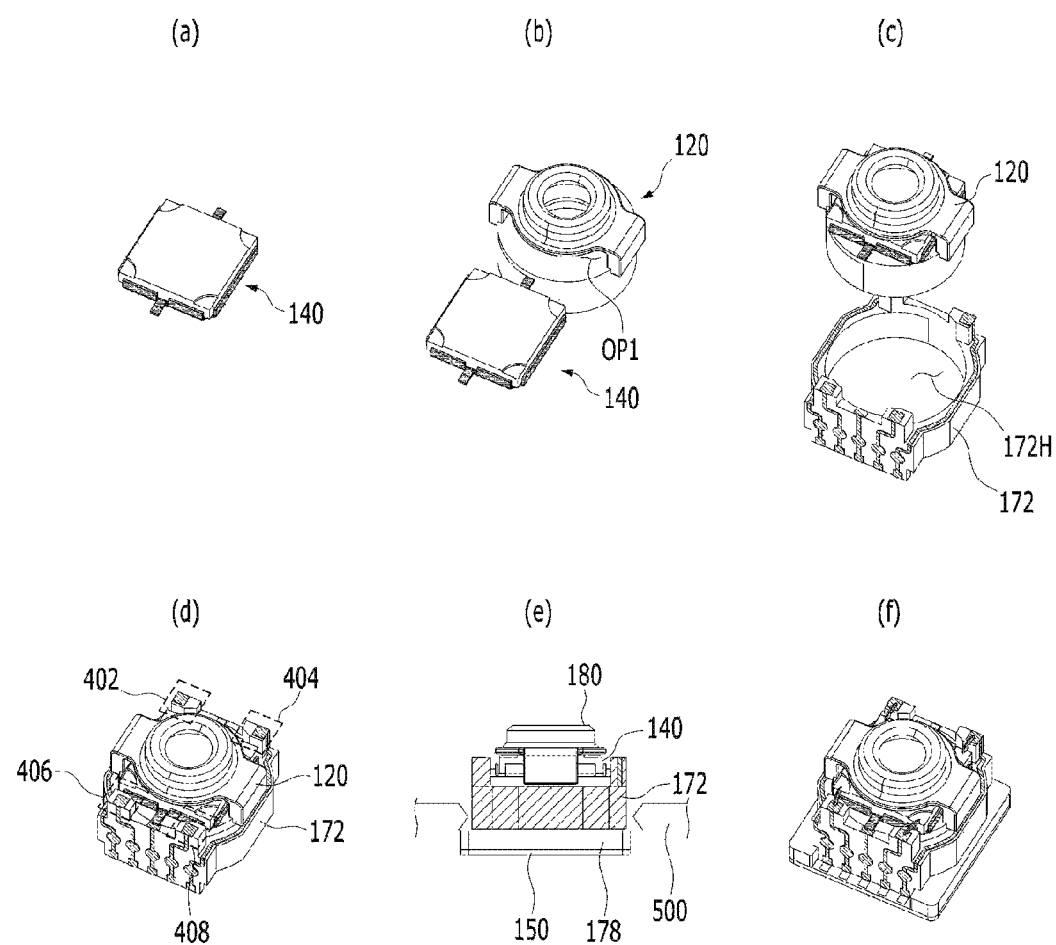

CAMERA MODULE

CROSS REFERENCE TO RELATED APPLICATIONS

This application is the National Phase of PCT International Application No. PCT/KR2019/000828, filed on Jan. 21, 2019, which claims priority under 35 U.S.C. 119(a) to Patent Application No. 10-2018-0008346, filed in the Republic of Korea on Jan. 23, 2018, all of which are hereby expressly incorporated by reference into the present application.

TECHNICAL FIELD

Embodiments relate to a camera module.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilizer (OIS) function.

In a conventional art, in order to implement the above-described various photographing functions, a method of combining a plurality of lenses and directly moving the combined lenses is used. In the case in which the number of lenses is increased, however, the size of an optical device may increase.

The auto-focusing and hand-tremor compensation functions are performed by moving or tilting a plurality of lenses, which are fixed to a lens holder and are aligned along an optical axis, in an optical-axis direction or a direction perpendicular to the optical axis. To this end, a separate lens moving apparatus is used to move a lens assembly composed of a plurality of lenses. However, the lens moving apparatus has high power consumption, and an additional cover glass needs to be provided separately from a camera module in order to protect the lens moving apparatus, thus causing a problem in that the overall size of the conventional camera module increases. In order to solve this problem, studies have been conducted on a liquid lens unit, which performs auto-focusing and hand-tremor compensation functions by electrically adjusting the curvature of an interface between two types of liquids.

DISCLOSURE

Technical Problem

Embodiments may provide a camera module that is small, has a reduced number of parts, has a simple manufacturing process, and is inexpensive.

The objects to be accomplished by the disclosure are not limited to the above-mentioned objects, and other objects not mentioned herein will be clearly understood by those skilled in the art from the following description.

Technical Solution

A camera module according to an embodiment may include a liquid lens unit, a lens holder in which the liquid lens unit is disposed, a main board configured to supply a driving signal to drive the liquid lens unit, and a base disposed between the liquid lens unit and the main board. The liquid lens unit may include a liquid lens including upper electrodes and a lower electrode, and a lower connection substrate connected to the lower electrode. The base may include an upper connection part configured to electrically connect the upper electrodes to the main board and disposed adjacent to the upper electrodes in a plan view, and a lower connection part configured to electrically connect the lower connection substrate to the main board.

For example, the lower connection substrate may include an outer terminal protruding toward the base so as to be connected to the lower connection part.

For example, the lens holder may include a first side portion including a first opening, a second side portion including a second opening disposed opposite the first opening in a direction perpendicular to the optical-axis direction, and an upper portion having a shape exposing the upper electrodes of the liquid lens unit toward the base together with the first opening and the second opening. The upper connection part may include a first upper connection part configured to electrically connect a first upper electrode disposed adjacent to the first opening among the exposed upper electrodes to the main board, and a second upper connection part configured to electrically connect a second upper electrode disposed adjacent to the second opening among the exposed upper electrodes to the main board.

For example, the base may include a first sidewall facing the first side portion of the lens holder, a second sidewall facing the second side portion of the lens holder, and a third side wall and a fourth side wall disposed opposite each other between the first sidewall and the second sidewall. The upper connection part and the lower connection part may be disposed on the surface of at least a portion of the first, second, third or fourth sidewall of the base.

For example, the first upper connection part may include a first upper terminal disposed on the first top surface of the first sidewall and connected to the first upper electrode, and a second upper terminal disposed on the side surface of the first sidewall between the first upper terminal and the main board.

For example, the second upper connection part may include a third upper terminal disposed on the second top surface of the second sidewall and connected to the second upper electrode, a terminal connection part extending from the third upper terminal to the first sidewall through at least one of the third or fourth sidewall, and a fourth upper terminal disposed on the side surface of the first sidewall between the terminal connection part and the main board while being spaced apart from the second upper terminal.

For example, the lower connection part may include a first lower terminal disposed on the third top surface of the first sidewall and connected to the outer terminal, and a second lower terminal disposed on the side surface of the first sidewall between the first lower terminal and the main board while being spaced apart from the second upper terminal and the fourth upper terminal.

For example, the main board may include a first pad disposed to be in contact with the second upper terminal, a second pad connected to the fourth upper terminal, and a third pad connected to the second lower terminal.

For example, the heights of the first to third top surfaces may be different from each other.

For example, the first upper electrode and the first upper terminal may be electrically connected to each other using at least one of metal epoxy, welding, soldering, or wire bonding, the second upper electrode and the third upper terminal may be electrically connected to each other using at least one of metal epoxy, welding, soldering, or wire bonding, and the outer terminal and the first lower terminal may be electrically connected to each other using at least one of metal epoxy, welding, soldering, or wire bonding.

For example, the first width of the center of the upper portion of the lens holder may be greater than the second width of the peripheral portion of the lens holder in a direction in which the first and second openings face each other, i.e. in a direction perpendicular to the optical axis.

For example, each of the second upper terminal, the fourth upper terminal, and the second lower terminal may include a first portion having a third width and disposed to be in contact with the first upper terminal, the third upper terminal, or the first lower terminal, a second portion having a fourth width greater than the third width and disposed to be in contact with the first, second or third pad, and a third portion disposed between the first portion and the second portion and having a fifth width greater than the fourth width.

For example, the lower connection substrate may further include a frame disposed on at least one of the bottom or the side portion of the liquid lens, and an inner terminal protruding inwards from the frame and connected to the lower electrode.

For example, the frame and the inner terminal of the lower connection substrate may have a shape allowing the liquid lens to be mounted in, seated in, in contact with, fixed to, provisionally fixed to, supported by, coupled to, or disposed in the lower connection substrate.

Advantageous Effects

In a camera module according to an embodiment, since an upper electrode and a main board are connected to each other using an upper connection part without using a first flexible printed circuit board (FPCB), a process of connecting the first FPCB to the upper electrode is unnecessary, thus reducing manufacturing time and costs. In the case in which first and second FPCBs, which transmit a driving voltage from the main board to a liquid lens, are bent to be directly connected to the main board, tolerance at the contact portions between the first and second FPCBs and the main board may increase due to bending of the first and second FPCBs. However, in the embodiment, since a lower connection substrate does not need to be bent, tolerance at the contact portion between the lower connection substrate and a base is relatively small. Thus, since the accuracy of tolerance is improved, electrical connection between the lower connection substrate and the main board may be realized more reliably. Since the lower connection substrate is configured to surround the liquid lens to protect the same, a spacer for this function is not required. When the first and second FPCBs are bent to be connected to the main board, if the size of the main board is small, electrical contact between the first and second FPCBs and the main board may be defective. However, in the embodiment, since the lower connection substrate is connected to the main board without being bent, even when the size of the main board is small, electrical contact between the lower connection substrate and the main board is realized reliably, and thus the size of the main board (or the camera module) may be further reduced. Even when the size of the lower connection substrate is small, the lower connection substrate is prevented from being disconnected or separated, and thus the reliability thereof is improved. Since the lower connection substrate does not need to be bent, conditions required for design of the lower connection substrate are not complicated, and thus the freedom of design of the lower connection substrate may increase. Since the upper and lower connection parts are provided with a third portion, the supply of a driving voltage to the liquid lens through the upper and lower connection parts is easily realized during active alignment, whereby the active alignment process may be easily and accurately performed, and thus the reliability of the camera module may be improved. As described above, since a spacer or a first FPCB is not required, the number of parts may be reduced, manufacturing processes such as active alignment may be rapidly performed, the horizontal area of the camera module that is perpendicular to an optical axis may decrease, thus reducing the size thereof, the manufacturing costs thereof may be reduced, and the manufacturing process thereof may be simplified.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates a schematic block diagram of a camera module according to an embodiment.

FIG. 2 illustrates a coupled perspective view of an embodiment of the camera module shown in FIG. 1.

FIG. 3 illustrates a coupled perspective view of the camera module shown in FIG. 2 from which a cover is removed for better understanding.

FIG. 4 illustrates an exploded perspective view of the camera module shown in FIG. 2.

FIG. 5 illustrates a right cross-sectional view taken along line A-A' in the camera module shown in FIG. 2.

FIG. 6 illustrates a plan view of the camera module shown in FIG. 2 from which the cover is removed for better understanding.

FIG. 7 illustrates an exploded perspective view of the liquid lens unit shown in FIGS. 3 to 6.

FIG. 8 illustrates a cross-sectional view of an embodiment of the liquid lens unit shown in FIG. 7.

FIG. 9 illustrates a perspective view of an embodiment of the base shown in FIGS. 3 to 6.

FIG. 10 is a schematic block diagram of the camera module.

FIGS. 11(a) to (f) are process perspective views for explaining a method of manufacturing the camera module according to the above-described embodiment.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, various exemplary embodiments described herein may be combined with each other, unless specifically mentioned otherwise.

In addition, with regard to an omission in the description of any one of various exemplary embodiments, the description of other embodiments may be applied thereto, unless specifically mentioned otherwise.

Hereinafter, a camera module 100 according to an embodiment will be described with reference to the accompanying drawings.

FIG. 1 illustrates a schematic block diagram of the camera module 100 according to an embodiment.

Referring to FIG. 1, the camera module 100 according to the embodiment may include a lens assembly 22, a control circuit 24, and an image sensor 26.

First, the lens assembly 22 may include a plurality of lens units and a lens holder in which the plurality of lens units is accommodated. As will be described below, the plurality of lens units may include a liquid lens, and may further include a first lens unit or a second lens unit. Alternatively, the plurality of lens units may include a liquid lens unit and first and second lens units.

The control circuit 24 serves to supply a driving voltage (an operation voltage, an operation signal, or a driving signal) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways according to the specifications required in the optical device. In particular, the control circuit 24 may be implemented as a single chip so as to reduce the magnitude of a driving voltage applied to the lens assembly 22. Thereby, the size of an optical device, which is mounted in a portable device, may be further reduced.

The image sensor 26 may function to convert the light that has passed through the lens assembly 22 into image data. To this end, the control circuit 24 may control the image sensor 26.

Hereinafter, an embodiment 100A of the camera module 100 shown in FIG. 1 will be described using the Cartesian coordinate system, but the embodiment is not limited thereto. In addition, in the Cartesian coordinate system, an x-axis, a y-axis, and a z-axis are perpendicular to each other, but the embodiment is not limited thereto. That is, the x-axis, the y-axis, and the z-axis may intersect each other, rather than being perpendicular to each other.

FIG. 2 illustrates a coupled perspective view of an embodiment 100A of the camera module 100 shown in FIG. 1, FIG. 3 illustrates a coupled perspective view of the camera module 100A shown in FIG. 2 from which a cover 170 is removed, FIG. 4 illustrates an exploded perspective view of the camera module 100A shown in FIG. 2, FIG. 5 illustrates a right cross-sectional view taken along line A-A' in the camera module 100A shown in FIG. 2, and FIG. 6 illustrates a plan view of the camera module 100A shown in FIG. 2 from which the cover 170 is removed.

Referring to FIGS. 2 to 6, the camera module 100A may include a lens assembly, a main board 150, a base 172, and an image sensor 182. In addition, the camera module 100A may further include a cover 170 and a sensor holder 178. In addition, the camera module 100A may further include a filter 176. In addition, the camera module 100A may further include a wire 174.

At least one of the components 110 to 182 of the camera module 100A shown in FIGS. 2 to 6 may be omitted. Alternatively, at least one component different from the components 110 to 182 shown in FIGS. 2 to 6 may be further included in the camera module 100A.

Referring to FIGS. 2 to 6, the lens assembly may include at least one of a first lens unit 110, a lens holder 120, a second lens unit 130, or a liquid lens unit 140, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140. However, the lens assembly may not include the first and second lens units 110 and 130.

The first lens unit 110 may be disposed at the upper side of the lens assembly, and may be a region on which light is incident from outside the lens assembly. That is, the first lens unit 110 may be disposed above the liquid lens unit 140 within the lens holder 120. Two or more lenses may be aligned along a center axis to form an optical system.

Here, the center axis may be an optical axis LX of the optical system, which is formed by at least one of the first lens unit 110, the liquid lens unit 140, or the second lens unit 130 included in the camera module 100, or may be an axis parallel to the optical axis LX. The optical axis LX may correspond to the center axis of the image sensor 182. That is, the first lens unit 110, the liquid lens unit 140, the second lens unit 130, and the image sensor 182 may be aligned with each other along the optical axis LX, and may be disposed so as to overlap each other through active alignment (AA).

Here, active alignment may mean an operation of aligning the optical axes of the first lens unit 110, the second lens unit 130, and the liquid lens unit 140 with each other and adjusting an axial relationship or distance relationship between the image sensor 182 and the lens units 110, 130 and 140 in order to acquire an improved image. Active alignment will be described in detail with reference to a method of manufacturing a camera module, which will be described later.

The first lens unit 110 may be implemented as a single lens, or may be implemented as two or more lenses. For example, referring to FIGS. 4 and 5, the first lens unit 110 may include a plurality of lenses L1 to L3. An exposure lens may be disposed at the upper side of the first lens unit 110. Here, the exposure lens may be the outermost lens among the lenses included in the first lens unit 110. That is, the lens located at the uppermost side of the first lens unit 110 may protrude upwards, and therefore, may function as the exposure lens. The exposure lens faces the risk of damage to the surface thereof since it protrudes outwards from the lens holder 120. When the surface of the exposure lens is damaged, the quality of an image captured by the camera module 100A may be deteriorated. Therefore, in order to prevent or suppress damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameters of the lenses included in the first lens unit 110 may be the same, as shown in FIG. 5, or may gradually increase toward the bottom (e.g. in the −z-axis direction), unlike the illustration of FIG. 5, but the embodiment is not limited thereto.

Referring to FIG. 5, the lens holder 120 may include a space in which the liquid lens unit 140 is disposed, and may include first and second holes H1 and H2, first to fourth side portions S1, S2, S3 and S4, and an upper portion US.

Referring to FIG. 4, the first and second holes H1 and H2 may be formed respectively in the upper portion and the lower portion of the lens holder 120 to open the upper portion and the lower portion of the lens holder 120 respectively. Here, the first hole H1 and the second hole H2 may be through-holes. The first lens unit 110 may be accommodated in, mounted in, seated in, in contact with, fixed to, provisionally fixed to, supported by, coupled to, or disposed in the first hole H1, which is formed in the lens holder 120, and the second lens unit 130 may be accommodated in, mounted in, seated in, in contact with, fixed to, provisionally fixed to, supported by, coupled to, or disposed in the second hole H2, which is formed in the lens holder 120.

In addition, the first and second side portions S1 and S2 of the lens holder 120 may be disposed so as to face each other in a direction (e.g. the y-axis direction) perpendicular to the direction of the optical axis LX, and the third and fourth side portions S3 and S4 may be disposed so as to face each other in a direction (e.g. the x-axis direction) intersecting (or perpendicular to) the direction of the optical axis LX. In addition, the first side portion S1 may include a first opening OP1, and the second side portion S2 may include a second opening OP2 having a shape that is the same as or similar to that of the first opening OP1. Thus, the first opening OP1 disposed in the first side portion S1 and the second opening OP2 disposed in the second side portion S2 may be disposed so as to face each other in a first direction (e.g. the y-axis direction) perpendicular to the direction of the optical axis LX.

The inner space of the lens holder 120, in which the liquid lens unit 140 is disposed, may be open due to the first and second openings OP1 and OP2. In this case, the liquid lens unit 140 may be inserted through at least one of the first opening OP1 or the second opening OP2 so as to be mounted in, seated in, in contact with, fixed to, provisionally fixed to, supported by, coupled to, or disposed in the inner space of the lens holder 120. For example, the liquid lens unit 140 may be inserted into the inner space of the lens holder 120 through the first or second opening OP1 or OP2.

As such, in order to allow the liquid lens unit 140 to be inserted into the inner space of the lens holder 120 through the first or second opening OP1 or OP2, the size of the first or second opening OP1 or OP2 may be greater than the thickness of the liquid lens unit 140 in the direction of the optical axis LX (e.g. the z-axis direction). Alternatively, in order to allow the liquid lens unit 140 to be inserted into the inner space of the holder 120 through the first or second opening OP1 or OP2, the size of the first or second opening OP1 or OP2 may be greater than the cross-sectional area of the liquid lens unit 140 when viewed from the y-axis direction.

In addition, the upper portion US of the lens holder 120 may have a shape exposing upper electrodes (or upper electrode sectors) E1 to E4 of the liquid lens unit 140 together with the first and second openings OP1 and OP2. Here, the upper electrode sectors may be some of the electrodes, as will be described in detail later.

As illustrated, when the plurality of electrodes E1 to E4 is disposed at four upper corners of the liquid lens 142, the upper portion US of the lens holder 120 may have a planar shape exposing the electrodes E1 to E4 to the outside.

Referring to FIG. 6, the first width W1 of the center portion of the lens holder 120 may be greater than the second width W2 of the peripheral portion of the lens holder 120 in the direction in which the first and second openings OP1 and OP2 face each other, i.e. in a direction (e.g. the y-axis direction) perpendicular to the optical axis. That is, the reason why the second width W2 of the peripheral portion of the lens holder 120 is less than the first width W1 of the center portion thereof in a plan view is to allow the lens holder 120 to expose the upper electrodes E1 to E4 together with the first and second openings OP1 and OP2.

In addition, the second width W2 of the peripheral portion of the lens holder 120 may be less than the diameter of each of the lenses (e.g. L1 to L3) included in the first lens unit 110 in a plan view, but the embodiment is not limited thereto.

The second lens unit 130 may be disposed below the liquid lens unit 140 within the lens holder 120. The second lens unit 130 and the first lens unit 110 may be spaced apart from each other in the optical-axis direction (e.g. the z-axis direction).

The light introduced into the first lens unit 110 from outside the camera module 100A may pass through the liquid lens unit 140 and may be introduced into the second lens unit 130. The second lens unit 130 may be implemented using a single lens, or may be implemented using two or more lenses L4 to L7, which are aligned along the center axis to form an optical system, as shown in FIG. 5.

Unlike the liquid lens unit 140, each of the first lens unit 110 and the second lens unit 130 may be a solid lens formed of glass or plastic, but the embodiment is not limited as to a specific material of each of the first lens unit 110 and the second lens unit 130.

Meanwhile, a portion of the liquid lens unit 140 may be mounted in, seated in, in contact with, fixed to, provisionally fixed to, supported by, coupled to, or disposed in the inner space between the first hole H1 and the second hole H2 in the lens holder 120 in the direction of the optical axis LX or in a direction (e.g. the z-axis direction) parallel to the direction of the optical axis LX. That is, a portion of the liquid lens unit 140 may be disposed between the first lens unit 110 and the second lens unit 130. However, the embodiment is not limited thereto. For example, according to another embodiment, the first lens unit 110 or the second lens unit 130 may be omitted, the liquid lens unit 140 may be disposed above the first lens unit 110 within the lens holder 120, or the liquid lens unit 140 may be disposed below the second lens unit 130 within the lens holder 120.

In addition, referring to FIG. 5, the other portion of the liquid lens unit 140 may be disposed in the first and second openings OP1 and OP2 in the lens holder 120. In addition, the liquid lens unit 140 may include parts (e.g. outer terminals OT1 and OT2) protruding to the outside of at least one of the first side portion S1 or the second side portion S2 of the lens holder 120 from the first and second openings OP1 and OP2.

The liquid lens unit 140 may include a liquid lens (or a liquid lens body) 142.

The liquid lens 142 will be described below.

FIG. 7 illustrates an exploded perspective view of the liquid lens unit 140 shown in FIGS. 3 to 6, and FIG. 8 illustrates a cross-sectional view of an embodiment of the liquid lens unit 140 shown in FIG. 7. FIG. 8 is a mere example given to facilitate understanding of the liquid lens 142, and the embodiment is not limited as to a specific structure of the liquid lens 142.

The liquid lens 142 may include a cavity CA. As shown in FIG. 8, the open area of the cavity CA that is oriented in the direction in which light is introduced may be smaller than the open area of the cavity CA that is oriented in the direction opposite thereto. Alternatively, the liquid lens 142 may be disposed such that the direction of inclination of the cavity CA is opposite to that in the illustration. That is, unlike the illustration of FIG. 8, the open area of the cavity CA that is oriented in the direction in which light is introduced may be larger than the open area of the cavity CA that is oriented in the direction opposite thereto. In addition, when the liquid lens 142 is disposed such that the direction of inclination of the cavity CA is opposite to that in the illustration, the arrangement of all or some of the components included in the liquid lens 142 may be changed, or only the direction of inclination of the cavity CA may be changed and the arrangement of the remaining components may not be changed, according to the direction of inclination of the liquid lens 142.

The liquid lens 142 may include a plurality of different types of liquids LQ1 and LQ2, first to third plates 147, 145 and 146, "n" upper electrodes (or 'individual electrodes') E1 to En, a lower electrode (or a 'common electrode') CO, and insulating layer 148. Here, "n" may be a positive integer of 1 or greater. When "n" is 1, an interface BO of the liquid lens 142 may be adjusted according to the voltage between one upper electrode and one lower electrode CO, thereby performing a focusing function. However, when "n" is a positive integer of 2 or greater, e.g. 4, the tilting of the interface of the liquid lens 142 may be adjusted according to voltages between four upper electrodes E1 to E4 and one lower electrode CO, thereby performing a hand-tremor compensation or optical image stabilizer (OIS) function as well as an auto-focusing (AF) function.

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed at a contact portion between the first and second liquids LQ1 and LQ2. For example, the second liquid LQ2 may be disposed on the first liquid LQ1, but the embodiment is not limited thereto.

In addition, in the cross-sectional shape of the liquid lens 142, the edges of the first and second liquids LQ2 and LQ1 may be thinner than the center portions thereof.

The first liquid LQ1 may be formed of, for example, a mixture of ethylene glycol and sodium bromide (NaBr). The second liquid LQ2 may be oil, and for example, may be phenyl-based silicon oil.

Each of the first liquid LQ1 and the second liquid LQ2 may include at least one of an antioxidant or a sterilizer. The antioxidant may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to prevent a change in the physical properties of the first and second liquids LQ1 and LQ2 due to oxidation of the first and second liquids LQ1 and LQ2 or propagation of microorganisms.

The inner surface of the first plate 147 may form a sidewall i of the cavity CA. The first plate 147 may include upper and lower openings having a predetermined inclined surface. That is, the cavity CA may be defined as a region surrounded by the inclined surface of the first plate 147, a third opening in contact with the second plate 145, and a fourth opening in contact with the third plate 146.

The diameter of the opening that is larger among the third and fourth openings may vary depending on the field of view (FOV) required for the liquid lens 142 or the role that the liquid lens 142 plays in the camera module 100A. According to the embodiment, the size (the area or the width) of the third opening $O_1$ may be greater than the size (the area or the width) of the fourth opening $O_2$. Here, the size of each of the third and fourth openings may be the cross-sectional area in the horizontal direction (e.g. the x-axis direction or the y-axis direction). For example, when each of the third and fourth openings has a circular cross-section, the size thereof may be a radius, and when each of the third and fourth openings has a square cross-section, the size thereof may be a diagonal length.

Each of the third and fourth openings may take the form of a hole having a circular cross-section, and the inclined surface thereof may have an inclination angle ranging from 55° to 65° or an inclination angle ranging from 50° to 70°, and may have an inclination angle of, for example, 60°. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is a portion through which the light that has passed through the first lens unit 110 passes. The first plate 147 may be formed of a transparent material, or may include impurities so that light does not easily pass therethrough.

The upper electrodes E1 to E4 and the lower electrode CO may be disposed on the first plate 147. That is, the upper electrodes E1 to E4 may be disposed on the top surface, the side surface, and the bottom surface of the first plate 147. The lower electrode CO may be disposed on at least a portion of the bottom surface of the first plate 147, and may be in direct contact with the first liquid LQ1.

In addition, each of the upper electrodes E1 to E4 and the lower electrode CO may include at least one electrode sector. For example, as shown in FIG. 7, the electrode sectors E1 to E4 of the upper electrodes may be disposed respectively on the upper corners of the liquid lens 142, and the electrode sectors CO of the lower electrode may be disposed respectively on the lower corners of the liquid lens 142. That is, the electrode sector E1, E2, E3 or E4 of the upper electrodes may mean the portion of the upper electrodes that is exposed rather than being covered by the second plate 145, and the electrode sector CO of the lower electrode may mean the portion of the lower electrode that is exposed rather than being covered by the third plate 146. The reference numerals E1 to E4 in the specification mean the electrode sectors of the upper electrodes, but in some cases, are described as meaning the upper electrodes themselves.

The upper electrodes E1 to E4 may include first upper electrodes and second upper electrodes. The first upper electrodes may be the upper electrodes (e.g. E1 and E4) that are adjacent to the first opening OP1 among the upper electrodes E1 to E4, and the second upper electrodes may be the upper electrodes that are adjacent to the second opening OP2 among the upper electrodes E1 to E4.

Referring to FIG. 7, each of the upper electrodes E1 to E4 and the lower electrode CO may include a plurality of electrode sectors sequentially arranged in the clockwise direction (or the counterclockwise direction) about the optical axis.

A portion of the lower electrode CO that is disposed on the other surface of the first plate 147 may be exposed to the first liquid LQ1, which is conductive.

Each of the upper electrodes E1 to E4 and the lower electrode CO may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on the surfaces of the upper electrodes E1 to E4. That is, the second plate 145 may be disposed on the first plate 147. Specifically, the second plate 145 may be disposed on the top surfaces of the upper electrodes E1 to E4 and on the cavity CA.

The third plate 146 may be disposed on the surface of the lower electrode CO. That is, the third plate 146 may be disposed under the first plate 147. Specifically, the third plate 146 may be disposed under the bottom surface of the lower electrode CO and under the cavity CA.

The second plate 145 and the third plate 146 may be disposed so as to face each other, with the first plate 147 interposed therebetween. In addition, at least one of the second plate 145 or the third plate 146 may be omitted.

At least one of the second plate 145 or the third plate 146 may have a rectangular planar shape. Each of the second and third plates 145 and 146 may be a region through which light passes, and may be formed of a light-transmitting material. For example, each of the second and third plates 145 and 146 may be formed of glass, and may be formed of the same material for convenience of processing. In addition, the edge of each of the second and third plates 145 and 146 may have a rectangular shape, without being necessarily limited thereto.

The second plate 145 may be configured so as to allow the light introduced from the first lens unit 110 to travel into the cavity CA in the first plate 147.

The third plate 146 may be configured so as to allow the light that has passed through the cavity CA in the first plate 147 to travel to the second lens unit 130. The third plate 146 may be in direct contact with the first liquid LQ1.

According to the embodiment, the third plate 146 may have a diameter greater than the diameter of the opening that is larger among the third and fourth openings in the first plate 147.

In addition, the actual effective lens area of the liquid lens 142 may be smaller than the diameter (e.g. $O_2$) of the opening that is larger among the third and fourth openings in the first plate 147. For example, when a region within a small radius about the center of the liquid lens 142 is used as an actual light transmission path, the diameter (e.g. $O_3$) of the center area of the third plate 146 may be smaller than the diameter (e.g. $O_2$) of the opening that is larger among the third and fourth openings in the first plate 147.

The insulating layer 148 may be disposed so as to cover a portion of the bottom surface of the second plate 145 in the upper area of the cavity CA. That is, the insulating layer 148 may be disposed between the second liquid LQ2 and the second plate 145.

In addition, the insulating layer 148 may be disposed so as to cover portions of the upper electrodes E1 to E4 that form the sidewall of the cavity CA. In addition, the insulating layer 148 may be disposed on the bottom surface of the first plate 147 so as to cover portions of the upper electrodes E1 to E4, the bottom surface of the first plate 147 that is exposed between the upper electrodes E1 to E4 and the lower electrode CO, and a portion of the lower electrode CO. Thus, contact between the upper electrodes E1 to E4 and the first liquid LQ1 and contact between the upper electrodes E1 to E4 and the second liquid LQ2 may be prevented by the insulating layer 148.

The insulating layer 148 may be formed of, for example, a coating agent such as parylene C, and may further include a white dye. The white dye may increase the rate of reflection of light from the insulating layer 148, which forms the sidewall i of the cavity CA.

The insulating layer 148 may cover at least one (e.g. the upper electrodes E1 to E4) of the upper electrodes E1 to E4 or the lower electrode CO, and may expose a portion of the other electrode (e.g. the lower electrode CO), so that electric energy is applied to the first liquid LQ1, which is conductive.

In addition, the liquid lens unit 140 may further include at least one substrate. Here, the at least one substrate may include a lower connection substrate (or a common electrode connection substrate) 144.

According to the embodiment, when a driving voltage is applied to the upper electrodes E1 to E4 and the lower electrode CO, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100A, and the optical device may perform an AF function and an OIS function.

The lower connection substrate 144 may be disposed on at least one of the bottom or the side portion of the liquid lens 142, and may be electrically connected to the lower electrode CO.

According to the embodiment, no connection substrate is disposed above the liquid lens 142. Thus, four different driving voltages (or 'individual voltages') supplied from the main board 150 may be directly applied to the electrode sectors of the upper electrodes E1 to E4 through an upper connection part UP of the base 172, which will be described later. Specifically, some of the four different individual voltages supplied from the main board 150 may be directly applied to the electrode sectors of the first upper electrodes (e.g. E1 and E4) through a first upper connection part UP1, and the remainder of the four different individual voltages may be directly applied to the electrode sectors of the second upper electrodes (e.g. E2 and E3) through a second upper connection part UP2.

On the other hand, the driving voltage (or 'common voltage') supplied from the main board 150 may be applied to the lower electrode CO via the lower connection substrate 144 through a lower connection part LP of the base 172, which will be described later. The common voltage may include DC voltage or AC voltage, and when the common voltage is applied in the form of a pulse, the width or duty cycle of the pulse may be constant.

Referring to FIG. 7, the lower connection substrate 144 may include a frame F, inner terminals IT, and first and second outer terminals OT1 and OT2.

The frame F is a part that is disposed on, attached to, or coupled to at least one of the bottom or the side portion of the liquid lens 142. For example, the frame F may be disposed on, attached to, or coupled to the side portion of the liquid lens 142.

The inner terminals IT are parts that are electrically connected to the electrode sectors of the lower electrode CO included in the liquid lens 142. The electrode sectors of the lower electrode CO of the liquid lens 142 are disposed on the four lower corners of the liquid lens 142, as shown in FIG. 7. Therefore, the inner terminals IT may be disposed on the inner edge of the frame F so as to face the electrode sectors CO in order to be electrically connected to the electrode sectors CO.

Although not shown, each of the inner terminals IT may include a through-hole. In this case, the inner terminals IT may be electrically connected to the electrode sectors CO of the lower electrode of the liquid lens 142 through the through-holes. For example, when a conductive material, e.g. conductive epoxy, is charged in the through-holes, the inner terminals IT and the electrode sectors CO of the lower electrode may be in contact with, coupled to, and electrically connected to each other.

The outer terminals are parts that protrude outwards, i.e. toward the base 172, from the frame F, and may include the first and second outer terminals OT1 and OT2, but the embodiment is not limited thereto. That is, according to another embodiment, the first or second outer terminal OT1 or OT2 may be omitted. The first outer terminal OT1 may protrude toward the lower connection part LP of the base 172, which will be described later, and may be electrically connected to the lower connection part LP.

Although the bottom surface of each of the inner terminals IT and the outer terminals OT1 and OT2 described above is illustrated as being flat, the embodiment is not limited thereto. According to another embodiment, as shown together with the coordinate system in the circular dotted line in FIG. 7, the lower connection substrate 144 may further include an outer protrusion OPT, which has a shape protruding from the bottom surface of the outer terminal OT1 in a direction oriented toward the main board 150 (e.g. the −z-axis direction). In this case, the outer terminal (e.g. OT1) may include a concave portion ORT formed in the top surface thereof. For example, when the top surface of the outer terminal (e.g. OT1) is pressed through press processing, the outer protrusion OPT and the concave portion ORT may be formed at the same time.

The outer terminal OT1 is a part that is electrically connected to the lower connection part LP of the base 172. Therefore, when the outer terminal OT1 includes the outer protrusion OPT, the outer terminal OT1 may be stably electrically connected to the lower connection part LP of the base 172.

In addition, the portions of the outer terminals OT1 and OT2 that are close to the frame F (hereinafter, connection frames CF) may have elasticity. When the bottom surface (or the outer protrusion OPT) of the first outer terminal OT1 is brought into contact with the lower connection part LP, if the connection frame CF having elasticity is not provided, the first outer terminal OT1 is not elastic at all, and may thus be damaged. In order to prevent this, the outer terminal OT1 may include the connection frame CF having elasticity.

Although not shown, like the outer terminals OT1 and OT2, the inner terminal IT may include a concave portion formed in the top surface thereof and an inner protrusion formed on the bottom surface thereof. Here, the inner protrusion may have the same shape as the outer protrusion OPT. For example, when the top surface of the inner terminal IT is pressed through press processing, the inner protrusion and the concave portion may be formed at the same time.

In addition, the frame F may have a shape that surrounds and accommodates the liquid lens 142 together with the inner terminals IT. This is to protect the liquid lens 142 from external impacts. That is, the frame F and the inner terminals IT of the lower connection substrate 144 may have a shape allowing the liquid lens 142 to be mounted in, seated in, in contact with, fixed to, provisionally fixed to, supported by, coupled to, or disposed in the lower connection substrate 144.

For example, the lower connection substrate 144 may be implemented as an FPCB or a single metal substrate (a conductive metal plate). According to another embodiment, the lower connection substrate 144 may have a plate shape that does not need to bend toward the main board 150, and the material of the plate may be metal.

Meanwhile, the base 172 is disposed between the liquid lens unit 140 and the main board 150, and serves to transmit a driving signal, output from the main board 150, to the liquid lens unit 140.

FIG. 9 illustrates a perspective view of an embodiment of the base 172 shown in FIGS. 3 to 6.

The base 172 may be disposed on the image sensor 182, and may be disposed so as to surround the second hole H2 formed in the lens holder 120. That is, the lens holder 120 may be disposed in the base 172, and the base 172 may accommodate the lens holder 120 and may be disposed so as to surround the side surface of the lens holder 120. The base 172 may include an accommodation hole 172H for accommodating the second hole H2. The diameter of the accommodation hole 172H may be greater than or equal to the outer diameter of the second hole H2. Here, although the shape of each of the accommodation hole 172H in the base 172 and the second hole H2 is illustrated as being a circular shape, the embodiment is not limited thereto, and the shape thereof may be any of various other shapes. The accommodation hole 172H may be formed at a position, near the center of the base 172, corresponding to the position of the image sensor 182 disposed in the camera module 100A. The accommodation hole 172H may be a through-hole, or may be a blind hole.

The base 172 may be mounted on the sensor holder 178, or may be mounted on the main board 150 when the sensor holder 178 is omitted.

The base 172 may include first to fourth sidewalls SW1 to SW4. The first sidewall SW1 may face the first side portion S1 of the lens holder 120, the second sidewall SW2 may face the second side portion S2 of the lens holder 120, the third sidewall SW3 may face the fourth side portion S4 of the lens holder 120, and the fourth sidewall SW4 may face the third side portion S3 of the lens holder 120. The third and fourth sidewalls SW3 and SW4 may be disposed opposite each other between the first sidewall SW1 and the second sidewall SW2.

In addition, the base 172 may include an upper connection part UP and a lower connection part LP. The upper connection part UP may electrically connect the upper electrodes E1 to E4 to the main board 150. The lower connection part LP may electrically connect the lower connection substrate 144 to the main board 150. That is, the outer terminal OT1 of the lower connection substrate 144 may protrude toward the base 172 and may be electrically connected to the lower connection part LP.

The upper connection part UP and the lower connection part LP may be disposed on the surface of at least a portion of the first, second, third or fourth sidewalls SW1 to SW4 of the base 172. As illustrated, the surface of the base 172 on which the upper connection part UP and the lower connection part LP are disposed may be the outer surface and the top surface of each of the sidewalls SW1 to SW4, or, unlike the illustration, may be the inner surface of each of the sidewalls SW1 To SW4.

The base 172 may include a first end portion, on which the upper connection part UP is disposed, and a second end portion, on which the lower connection part LP is disposed. The first end portion and the second end portion may be formed so as to have a step formed therebetween. One or two or more upper connection parts may be provided, and accordingly, the base may include one or two or more first end portions so that the upper connection parts are respectively disposed thereon. The base may include protruding portions on which the upper connection parts are disposed. One end of the protruding portion may be the first end portion. The number of protruding portions may correspond to the number of electrodes disposed on the liquid lens. One or two or more lower connection parts may be provided, and accordingly, the base may include one or two or more second end portions on which the lower connection parts are disposed. The base may include grooves in which the lower connection parts are disposed. The grooves in which the lower connection parts are disposed may be disposed between the protruding portions on which the upper connection parts are disposed. The number of grooves in which the lower connection parts are disposed may correspond to the number of electrodes disposed under the liquid lens. In addition, the difference in height between the protruding portions and the grooves may correspond to the difference in height between the upper electrode and the lower electrode of the liquid lens. The positions of the first end portion and the second end portion may be positions corresponding to the top surface of the upper electrode and the bottom surface of the lower electrode of the liquid lens. Describing one embodiment with reference to FIG. 9, since a plurality of individual electrodes is disposed on the liquid lens and one common electrode is disposed under the liquid lens, the base may include four protruding portions on which the upper connection parts are disposed and one groove in which the lower connection part is disposed. Due to the shape of the base and the arrangement of the connection parts, it is easy to connect the electrodes of the liquid lens to the outside.

The base may include a first wall, on which a first upper terminal and a lower terminal are disposed, a second wall, which is opposite the first wall and spaced apart from the first wall and on which a second upper terminal, which is different from the first upper terminal, is disposed, and connection walls, which connect the first wall and the second wall to each other. The maximum height of the connection walls in the optical-axis direction may be less than the maximum height of the first wall or the second wall in the optical-axis direction. The second upper terminal may extend along the second wall to the side surface of the first wall, and may be disposed on the side surface of the first wall. The first upper terminal and the lower terminal may extend to and be disposed on the side surface of the first wall. The first upper terminal, the second upper terminal, and the lower terminal may extend to and be disposed on the lower end of the first wall. The first wall and the second wall of the base may be disposed at positions corresponding to the first opening and the second opening in the holder, respectively. Since electrical signals are capable of being applied to one of the walls of the base due to the arrangement and extension of the terminals, assembly and control may be easily performed.

The upper connection part UP may include a first upper connection part UP1 and a second upper connection part UP2.

The first upper connection part UP1 may electrically connect the first upper electrodes E1 and E4, which are adjacent to the first opening OP1 among the upper electrodes E1 to E4, to the main board 150. To this end, the first upper connection part UP1 may include a $1\text{-}1^{st}$ upper connection part UP11 and a $1\text{-}2^{nd}$ upper connection part UP12. The $1\text{-}1^{st}$ upper connection part UP11 may electrically connect one E1 of the first upper electrodes E1 and E4, which are adjacent to the first opening OP1 among the upper electrodes E1 to E4, to the main board 150. The $1\text{-}2^{nd}$ upper connection part UP12 may electrically connect the other one E4 of the first upper electrodes E1 and E4, which are adjacent to the first opening OP1 among the upper electrodes E1 to E4, to the main board 150.

The second upper connection part UP2 may electrically connect the second upper electrodes E2 and E3, which are adjacent to the second opening OP2 among the upper electrodes E1 to E4, to the main board 150. To this end, the second upper connection part UP2 may include a $2\text{-}1^{st}$ upper connection part UP21 and a $2\text{-}2^{nd}$ upper connection part UP22. The $2\text{-}1^{st}$ upper connection part UP21 may electrically connect one E2 of the second upper electrodes E2 and E3, which are adjacent to the second opening OP2 among the upper electrodes E1 to E4, to the main board 150. The $2\text{-}2^{nd}$ upper connection part UP22 may electrically connect the other one E3 of the second upper electrodes E2 and E3, which are adjacent to the second opening OP2 among the upper electrodes E1 to E4, to the main board 150.

In addition, the first upper connection part UP1 may include a first upper terminal and a second upper terminal. That is, among the first upper connection part UP1, the $1\text{-}1^{st}$ upper connection part UP11 may include a first upper terminal UT11, which is disposed on a first top surface 172S1 of the first sidewall SW1 and is connected to one E1 of the first upper electrodes E1 and E4, and a second upper terminal UT12, which is disposed on the side surface of the first sidewall SW1 between the first upper terminal UT11 and the main board 150. Among the first upper connection part UP1, the 1-$2^{nd}$ upper connection part UP12 may include a first upper terminal UT21, which is disposed on a first top surface 172S2 of the first sidewall SW1 and is connected to the other one E4 of the first upper electrodes E1 and E4, and a second upper terminal UT22, which is disposed on the side surface of the first sidewall SW1 between the first upper terminal UT21 and the main board 150.

In addition, the second upper connection part UP2 may include a third upper terminal, a terminal connection part, and a fourth upper terminal. Among the second upper connection part UP2, the 2-$1^{st}$ upper connection part UP21 may include a third upper terminal UT13, a terminal connection part TC1, and a fourth upper terminal UT14. The third upper terminal UT13 may be disposed on the second top surface 172S3 of the second sidewall SW2, and may be connected to one E2 of the second upper electrodes E2 and E3. The terminal connection part TC1 may extend from the third upper terminal UT13 to the first sidewall SW1 through one SW3 of the third and fourth sidewalls SW3 and SW4, and may be disposed on the first sidewall SW1. The fourth upper terminal UT14 may be disposed on the side surface of the first sidewall SW1 between the terminal connection part TC1 and the main board 150.

Among the second upper connection part UP2, the 2-$2^{nd}$ upper connection part UP22 may include a third upper terminal UT23, a terminal connection part TC2, and a fourth upper terminal UT24. The third upper terminal UT23 may be disposed on the second top surface 172S4 of the second sidewall SW2, and may be connected to one E3 of the second upper electrodes E2 and E3. The terminal connection part TC2 may extend from the third upper terminal UT23 to the first sidewall SW1 through the other one SW4 of the third and fourth sidewalls SW3 and SW4, and may be disposed on the first sidewall SW1. The fourth upper terminal UT24 may be disposed on the side surface of the first sidewall SW1 between the terminal connection part TC2 and the main board 150.

In addition, the lower connection part LP may include a first lower terminal LP1 and a second lower terminal LP2. The first lower terminal LP1 may be disposed on the third top surface 172S5 of the first sidewall SW1, and may be connected to the outer terminal OT1 of the lower connection substrate 144. The second lower terminal LP2 may be disposed on the side surface of the first sidewall SW1 between the first lower terminal LP1 and the main board 150.

The second upper terminals UT12 and UT22, the fourth upper terminals UT14 and UT24, and the second lower terminal LP2 may be spaced apart from each other on the outer surface of the first sidewall SW1. This is to prevent electrical shorts among the components.

In addition, the heights of the first to third top surfaces 172S1 to 172S5 may be different from each other.

In addition, referring to FIG. 3, each of the second upper terminals UT12 and UT22, the fourth upper terminals UT14 and UT24, and the second lower terminal LP2 may include first, second and third portions. For example, the fourth upper terminal UT14 may include first to third portions P1 to P3. The first portion P1 may have a third width W3, the second portion P2 may have a fourth width W4, and the third portion P3 may have a fifth width W5. Here, the fourth width W4 may be greater than the third width W3, and the fifth width W5 may be greater than the fourth width W4. The first portion P1 is a portion that is in contact with the first upper terminals UT11 and UT21, the third upper terminals UT13 and UT23, or the first lower terminal LP1. The second portion P2 is a portion that is in contact with first to third pads P11, P12, P21, P22 and P3 of the main board 150, and the third portion P3 is a portion that is disposed between the first portion P1 and the second portion P2.

When the fourth width W4 of the second portion P2 is large, electrical contact between the first to third pads P11, P12, P21, P22 and P3 and the second portion P2 may be more stable.

In addition, when active alignment is performed, the third portion P3 may be gripped by a gripper in order to apply a driving voltage to the liquid lens 142. As the fifth width W5 of this portion P3 increases, the driving voltage may be more stably supplied to the liquid lens 142 during the active alignment.

In addition, the first upper electrodes E1 and E4 and the first upper terminals UT11 and UT21 may be electrically connected to each other using at least one of metal epoxy (e.g. Ag epoxy), welding, soldering, or wire bonding. The second upper electrodes E2 and E3 and the third upper connection parts UT13 and UT23 may also be electrically connected to each other using at least one of metal epoxy, welding, soldering, or wire bonding. The outer terminal OT1 and the first lower terminal LP1 may also be electrically connected to each other using at least one of metal epoxy, welding, soldering, or wire bonding.

For example, referring to FIG. 6, the first upper electrodes E1 and E4 and the first upper terminals UT11 and UT21 may be electrically connected to each other via first and fourth wires 174a1 and 174a4, respectively. The second upper electrodes E2 and E3 and the third upper connection parts UT13 and UT23 may be connected to each other via second and third wires 174a2 and 174a3, respectively.

In addition, referring to FIG. 6, the upper connection parts UP11 and UP12 may be disposed adjacent to the upper electrodes E1 to E4 in a plan view. That is, among the upper connection parts UP1 and UP2, the first upper terminals UT11 and UT21 may be disposed adjacent to the first upper electrodes E1 and E4, respectively, in a plan view, and among the upper connection parts UP1 and UP2, the third upper terminals UT13 and UT23 may be disposed adjacent to the second upper electrodes E2 and E3, respectively, in a plan view. This neighboring arrangement may facilitate electrical connection among neighboring parts.

As illustrated, each of the upper connection part UP and the lower connection part LP may be a surface electrode or a surface electrode pattern formed on the surface of the base 172, but the embodiment is not limited as to a specific form of each of the upper connection part UP and the lower connection part LP.

As described above, the base 172 may be designed in a molded interconnect device (MID) type such that the upper connection part UP and the lower connection part LP are disposed on the surface thereof.

In addition, since the upper connection part UP and the lower connection part LP are disposed only on one sidewall (e.g. SW1) among the plurality of sidewalls of the base 172, the horizontal area of the camera module 100A, which is perpendicular to the optical axis LX, may decrease compared to that when the upper connection part UP and the lower connection part LP are disposed on different respective sidewalls among the plurality of sidewalls of the base 172.

Meanwhile, the filter 176 may be disposed between the base 172 and the image sensor 182 and may filter light within a specific wavelength range, among the light that has passed through the first lens unit 110, the liquid lens unit 140, and the second lens unit 130. The filter 176 may be an infrared (IR) light blocking filter, which blocks IR light, or an ultraviolet (UV) light blocking filter, which blocks UV light, but the embodiment is not limited thereto. The filter 176 may be disposed on the image sensor 182. The IR or UV light blocking filter 176 may be disposed inside the sensor holder 178. For example, the filter 176 may be disposed or mounted in an inner recess in the sensor holder 178 or on a stepped portion thereof.

The sensor holder 178 may be disposed under the base 172, and may be attached to the main board 150. The sensor holder 178 may surround the image sensor 182 and may protect the image sensor 182 from foreign substances or external impacts.

The lens holder 120 in which the base 172, the second lens unit 130, the liquid lens unit 140, and the first lens unit 110 are disposed may be disposed on the sensor holder 178.

Meanwhile, the main board 150 may be disposed below the base 172, and the image sensor 182 may be mounted on, seated on, in contact with, fixed to, provisionally fixed to, supported by, or coupled to the plane of the main board 150 that intersects the optical axis LX. Alternatively, according to another embodiment, a recess (not shown) for accommodating the image sensor 182 may be formed in the main board 150, but the embodiment is not limited as to a specific arrangement type of the image sensor 182 on the main board 150.

The main board 150 may include first to third pads P11, P12, P21, P22 and P3 to supply a driving voltage. The driving voltage supplied from the main board 150 may be supplied to the liquid lens 142 through the first to third pads P11, P12, P21, P22 and P3 and the upper and lower connection parts UP and LP.

Meanwhile, the cover 170 may be disposed so as to surround the lens holder 120, the liquid lens unit 140, and the base 172, and may protect these components 120, 140 and 172 from external impacts. In particular, due to the arrangement of the cover 170, a plurality of lenses constituting the optical system may be protected from external impacts.

In addition, the cover 170 may include an upper opening 170H formed in the top surface thereof so that the first lens unit 110 disposed in the lens holder 120 is exposed to external light.

In addition, the upper opening 170H may be a hole, or a window formed of a light-transmitting material may be disposed in the hole, thereby preventing foreign substances, such as dust or moisture, from entering the camera module 100A.

The image sensor 182 may function to convert the light that has passed through the first lens unit 110, the liquid lens unit 140 and the second lens unit 130 of the lens assembly 110, 120, 130 and 140 into image data. More specifically, the image sensor 182 may convert light into analog signals through a pixel array including a plurality of pixels, and may synthesize digital signals corresponding to the analog signals to thereby generate image data.

The main board 150 may constitute a control module that controls the liquid lens unit 140 and the image sensor 182. Here, the control module will be described below with reference to FIG. 10.

FIG. 10 is a schematic block diagram of the camera module 200.

Referring to FIG. 10, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130 and 140 shown in FIG. 4.

The control circuit 210 may include a control unit 220, and may control the operation of the liquid lens unit 140 including a liquid lens 280. Here, the liquid lens 280 may correspond to the liquid lens 142 described above.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low-pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate the driving voltage corresponding to the desired shape of the liquid lens 280 based on a focal length, which is required to focus on the object, using the distance information.

The controller 230 may store a driving voltage table in which a driving voltage and a driving voltage code for making the voltage driver 235 generate the driving voltage are mapped, may acquire the driving voltage code corresponding to the calculated driving voltage by referring to the driving voltage table, and may output the acquired driving voltage code to the voltage driver 235.

The voltage driver 235 may generate a driving voltage in an analog form, which corresponds to the driving voltage code, based on a driving voltage code in a digital form provided from the controller 230, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the upper electrodes E1 to E4 and the lower electrode CO.

The control circuit 210 may further include a connector (not shown), which performs a communication or interface function of the control circuit 210. For example, the connector may perform communication protocol conversion for communication between the control circuit 210, which uses an inter-integrated circuit (I²C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280.

The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connector, but the embodiment is not limited thereto. The connector may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

Hereinafter, a method of manufacturing the camera module 100A according to the above-described embodiment will be described.

FIGS. 11(a) to (f) are process perspective views for explaining a method of manufacturing the camera module 100A according to the above-described embodiment. Here, the same components as those of the camera module 100A according to the above-described embodiment are denoted by the same reference numerals, and a duplicate description thereof will be omitted.

For convenience of description, it is assumed that the processes shown in FIGS. 11(a) to (f) are performed after the first lens unit 110 and the second lens unit 130 are mounted in the lens holder 120 and the image sensor 182 and the sensor holder 178 are mounted on the main board 150, although not illustrated. However, the following description may also be applied to cases other than the above case.

Thereafter, referring to FIG. 11(a), the liquid lens 142 is connected to the lower connection substrate 144. To this end, conductive epoxy (e.g. Ag) or thermal epoxy may be used.

Thereafter, referring to FIG. 11(b), the liquid lens unit 140 is inserted into and disposed inside the lens holder 120.

Thereafter, referring to FIG. 11(c), the lens holder 120 is inserted into and coupled to the accommodation hole 172H in the base 172.

Thereafter, referring to FIG. 11(d), as denoted by reference numerals 402 to 408, the upper electrodes E1 to E4 and the upper connection part UP are electrically connected to each other using at least one of conductive metal epoxy (e.g. Ag epoxy), welding, soldering, or wire bonding in the state in which the upper electrodes E1 to E4 and the upper connection part UP are disposed so as to face each other in a plan view.

Thereafter, referring to FIG. 11(e), in the state in which the gripper 500 grips the third portion P3 on the first sidewall SW1 of the base 172, a driving voltage is supplied to the liquid lens 142 of the liquid lens unit 140, and at the same time, the positions of the first lens unit 110, the second lens unit 130 and the liquid lens unit 140 relative to each other are adjusted, thereby primarily performing active alignment of aligning the optical axes of the first lens unit 110, the second lens unit 130 and the liquid lens 142 with each other.

Thereafter, the first and second lens units 110 and 130 and the liquid lens unit 140 are coupled to each other. At this time, the first and second lens units 110 and 130 and the liquid lens unit 140 may be coupled to each other using at least one of UV curing or thermal curing.

Thereafter, the base 172 is gripped by the gripper and is shifted to various positions so that the positions of the image sensor 182 and the lens holder 120 relative to each other are adjusted, thereby secondarily performing active alignment of aligning the optical axes of the first lens unit 110, the liquid lens 142, the second lens unit 130 and the image sensor 182 with each other.

Thereafter, referring to FIG. 11(f), the second portion P2 of the first sidewall SW1 of the base 172 and the first to third pads P11, P12, P21, P22 and P3 of the main board 150 are electrically connected to each other using soldering or the like.

Thereafter, the cover 170 may be disposed so as to surround the lens holder 120 and the base 172.

In addition, with regard to the epoxy used to couple the components to each other in the description above, UV curing may be primarily performed and thermal curing may be secondarily performed, but the embodiment is not limited to any specific epoxy-curing method.

Meanwhile, the camera module 100A according to the embodiment and a camera module according to a comparative example will be described below.

The camera module according to the comparative example includes a liquid lens unit, a main board, and first and second flexible printed circuit boards. The liquid lens unit, the main board and the second flexible printed circuit board of the camera module according to the comparative example perform the same functions as the liquid lens unit 140, the main board 150 and the lower connection substrate 144 of the camera module 100A according to the embodiment. In the camera module according to the comparative example, the first flexible printed circuit board serves to electrically connect the liquid lens unit to the main board.

In addition, in the camera module according to the comparative example, the liquid lens unit includes a first electrode, a second electrode, a spacer, and a liquid lens. Here, the first electrode, the second electrode and the liquid lens perform the same functions as the upper electrodes E1 to E4, the lower electrode CO and the liquid lens 142 of the camera module 100A according to the embodiment.

In the camera module according to the comparative example, in order to electrically connect the liquid lens unit to the main board, each of the first and second flexible printed circuit boards connected to the liquid lens unit is bent to be electrically connected to the main board. This may lead to several problems, described below.

When the size of the main board is small, the first and second flexible printed circuit boards, when bent, may not be accurately brought into contact with the main board, thus causing a defect of poor electrical connection between the first and second flexible printed circuit boards and the main board.

In addition, the connection between the liquid lens unit and the first and second flexible printed circuit boards may also become defective. In particular, when the size of the first and second flexible printed circuit boards is small, the first and second flexible printed circuit boards are likely to be disconnected or separated from the liquid lens unit, and thus the reliability thereof may be deteriorated.

In addition, since the first and second flexible printed circuit boards need to be bent, when the first and second flexible printed circuit boards are designed, the bending thereof needs to be included as a design consideration, which increases design constraints.

On the other hand, in the camera module 100A according to the embodiment, the structure of the lens holder 120, the structure of the base 172 and the structure of the liquid lens unit 140 are modified so that the upper electrodes E1 to E4 are electrically connected to the main board 150 via the upper connection part UP disposed on the surface of the base 172 without the aid of a member such as the first flexible printed circuit board of the comparative example. In the case in which the first flexible printed circuit board is disposed on the liquid lens, like the comparative example, the x-axis length of the first flexible printed circuit board needs to be at least 0.45 mm, and the y-axis length thereof needs to be at least 0.85 mm. However, since the embodiment does not require the first flexible printed circuit board, the horizontal area (that is, a product of the x-axis length and the y-axis length) of the camera module 100A that is perpendicular to the optical axis decreases, thus reducing the size thereof, and a process for connecting the first flexible printed circuit board to the upper electrode is unnecessary, thus reducing manufacturing costs.

In the comparative example, since the first and second flexible printed circuit boards (FPCBs), which transmit a driving voltage from the main board to the liquid lens, are bent to be directly connected to the main board, tolerance at the contact portions between the first and second flexible printed circuit boards and the main board may increase due to bending of the first and second flexible printed circuit boards. However, in the embodiment, since the first flexible printed circuit board is not required and the lower connection part LP of the base 172 electrically connects the lower connection substrate 144 to the main board 150, the lower connection substrate 144 does not need to be bent, and thus tolerance at the contact portion between the lower connection substrate 144 and the base 172 is smaller than that in the comparative example. As such, since the accuracy of tolerance is improved, electrical connection between the lower connection substrate 144 and the main board 150 may be reliably realized.

In addition, the comparative example requires a spacer in order to protect the liquid lens. On the other hand, according to the embodiment, since the lower connection substrate 144 is configured to surround the liquid lens 142 to protect the same, the liquid lens unit 140 does not require a spacer. Therefore, the number of components is reduced, and thus the size and manufacturing costs may be reduced.

In addition, when the first and second flexible printed circuit boards are bent, if the size of the main board is small, electrical contact between each flexible printed circuit board and the main board may be defective. However, in the embodiment, even when the size of the main board 150 is small, electrical contact between the lower connection substrate 144 and the main board 150 is realized reliably, and thus the size of the main board 150 (or the camera module 100A) may be further reduced.

In addition, electrical connection between the liquid lens unit 140 and the lower connection substrate 144 is realized reliably. In particular, even when the size of the lower connection substrate 144 is small, the lower connection substrate 144 is prevented from being disconnected or separated from the liquid lens unit, and thus the reliability thereof is improved.

In addition, since the upper and lower connection parts UP and LP are provided with the third portion P3, the supply of driving voltage to the liquid lens 142 through the upper and lower connection parts UP and LP is easily realized during active alignment, whereby the active alignment process may be easily and accurately performed, and thus the reliability of the camera module may be improved.

In addition, since the number of components, such as a spacer and a first flexible printed circuit board, is smaller than that of the comparative example, manufacturing processes such as active alignment may be rapidly performed.

Meanwhile, an optical device may be implemented using the camera module 100A including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100A, a display unit (not shown) configured to output an image, a battery (not shown) configured to supply power to the camera module 100A, and a body housing in which the camera module 100A, the display unit, and the battery are mounted. The optical device may further include a communication module, which may communicate with other devices, and a memory unit, which may store data. The communication module and the memory unit may also be mounted in the body housing.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in camera/video devices, telescopic devices, microscopic devices, an interferometer, a photometer, a polarimeter, a spectrometer, a reflectometer, an auto-collimator, a lensmeter, a smartphone, a laptop computer, a tablet computer, etc.

The invention claimed is:

1. A camera module, comprising:
a liquid lens unit;
a lens holder in which the liquid lens unit is disposed;
a main board configured to supply a driving signal to drive the liquid lens unit; and
a base disposed on the main board, the base having an inner space in which the liquid lens unit is disposed,
wherein the liquid lens unit comprises:
a liquid lens comprising upper electrodes and a lower electrode; and
a lower connection substrate connected to the lower electrode, and
wherein the base comprises:
an upper connection part configured to electrically connect the upper electrodes to the main board, the upper connection part being disposed adjacent to the upper electrodes in a plan view; and
a lower connection part configured to electrically connect the lower connection substrate to the main board.

2. The camera module according to claim 1, wherein the lower connection substrate comprises an outer terminal protruding toward the base so as to be connected to the lower connection part.

3. The camera module according to claim 2, wherein the lens holder comprises:
a first side portion comprising a first opening;
a second side portion comprising a second opening disposed opposite the first opening in a direction perpendicular to an optical-axis direction; and
an upper portion having a shape exposing the upper electrodes of the liquid lens unit together with the first opening and the second opening, and
wherein the upper connection part comprises:
a first upper connection part configured to electrically connect a first upper electrode disposed adjacent to the first opening among the exposed upper electrodes to the main board; and
a second upper connection part configured to electrically connect a second upper electrode disposed adjacent to the second opening among the exposed upper electrodes to the main board.

4. The camera module according to claim 3, wherein the base comprises:
a first sidewall facing the first side portion of the lens holder;
a second sidewall facing the second side portion of the lens holder; and
a third side wall and a fourth side wall disposed opposite each other between the first sidewall and the second sidewall, and
wherein the upper connection part and the lower connection part are disposed on a surface of at least a portion of the first, second, third or fourth sidewall of the base.

5. The camera module according to claim 4, wherein the first upper connection part comprises:
a first upper terminal disposed on a first top surface of the first sidewall and connected to the first upper electrode; and
a second upper terminal disposed on a side surface of the first sidewall between the first upper terminal and the main board.

6. The camera module according to claim 5, wherein the second upper connection part comprises:
a third upper terminal disposed on a second top surface of the second sidewall and connected to the second upper electrode;
a terminal connection part extending from the third upper terminal to the first sidewall through at least one of the third or fourth sidewall; and
a fourth upper terminal disposed on the side surface of the first sidewall between the terminal connection part and the main board, the fourth upper terminal being spaced apart from the second upper terminal.

7. The camera module according to claim 6, wherein the lower connection part comprises:
a first lower terminal disposed on a third top surface of the first sidewall and connected to the outer terminal; and
a second lower terminal disposed on the side surface of the first sidewall between the first lower terminal and the main board, the second lower terminal being spaced apart from the second upper terminal and the fourth upper terminal.

8. The camera module according to claim 7, wherein the main board comprises:
a first pad disposed to be in contact with the second upper terminal;
a second pad connected to the fourth upper terminal; and
a third pad connected to the second lower terminal.

9. The camera module according to claim 7, wherein the first upper electrode and the first upper terminal are electrically connected to each other using at least one of metal epoxy, welding, soldering, or wire bonding,
wherein the second upper electrode and the third upper terminals are electrically connected to each other using at least one of metal epoxy, welding, soldering, or wire bonding, and
wherein the outer terminal and the first lower terminal are electrically connected to each other using at least one of metal epoxy, welding, soldering, or wire bonding.

10. The camera module according to claim 8, wherein each of the second upper terminal, the fourth upper terminal, and the second lower terminal comprises:
a first portion having a third width, the first portion being in contact with the first upper terminal, the third upper terminal, or the first lower terminal;
a second portion having a fourth width greater than the third width, the second portion being in contact with the first, second or third pad; and
a third portion disposed between the first portion and the second portion, the third portion having a fifth width greater than the fourth width.

11. The camera module according to claim 2, wherein the lower connection substrate includes an outer protrusion having a shape protruding from a bottom surface of the outer terminal in a direction oriented toward the main board.

12. The camera module according to claim 3, wherein a first width of a center of the upper portion of the lens holder is greater than a second width of a peripheral portion of the lens holder in a direction, in which the first and second openings face each other, perpendicular to the optical axis.

13. The camera module according to claim 7, wherein the upper connection part and the lower connection part are disposed only on one sidewall among the first, second, third, and fourth sidewalls of the base.

14. The camera module according to claim 13, wherein the second upper terminal, the fourth upper terminal, and the second lower terminal are spaced apart from each other on an outer surface of the one sidewall.

15. The camera module according to claim 7, wherein heights of the first to third top surfaces are different from each other.

16. The camera module according to claim 2, wherein the lower connection substrate includes:
   a frame disposed on at least one of bottom portion or side portion of the liquid lens; and
   an inner terminal protruding inwards from the frame and connected to the lower electrode.

17. The camera module according to claim 16, wherein the frame and the inner terminal of the lower connection substrate have a shape allowing the liquid lens to be mounted in, seated in, in contact with, fixed to, provisionally fixed to, supported by, coupled to, or disposed in the lower connection substrate.

18. The camera module according to claim 16, wherein the lower connection substrate includes an inner protrusion having a shape protruding from a bottom surface of the inner terminal in a direction oriented toward the main board.

19. The camera module according to claim 16, wherein the outer terminals includes a connection frame adjacent to the frame and having elasticity.

20. The camera module according to claim 16, wherein the lower electrode and the inner terminal are in contact with, coupled to, and electrically connected to each other using a conductive material.

\* \* \* \* \*